US008958942B2

(12) United States Patent
Kolcarek et al.

(10) Patent No.: US 8,958,942 B2
(45) Date of Patent: Feb. 17, 2015

(54) SYSTEMS AND METHODS FOR DISPLAYING AIRCRAFT BRAKING DISTANCE DURING SURFACE OPERATIONS (71) Applicants: Pavel Kolcarek, Brno (CZ); Jiri Vasek, Brno (CZ); Tomas Svoboda, Brno (CZ); Olukayode Olofinboba, Eden Prairie, MN (US); Jean-Luc Derouineau, Cornebarrieu (FR)

(72) Inventors: Pavel Kolcarek, Brno (CZ); Jiri Vasek, Brno (CZ); Tomas Svoboda, Brno (CZ); Olukayode Olofinboba, Eden Prairie, MN (US); Jean-Luc Derouineau, Cornebarrieu (FR)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/804,294

(22) Filed: Mar. 14, 2013

(65) Prior Publication Data
US 2013/0325245 A1 Dec. 5, 2013

Related U.S. Application Data (60) Provisional application No. 61/653,297, filed on May 30, 2012, provisional application No. 61/706,632, filed on Sep. 27, 2012.

(51) Int. Cl.
G01M 17/00 (2006.01)
G08B 21/00 (2006.01)
G06F 17/00 (2006.01)
B64C 25/42 (2006.01)
B64D 43/00 (2006.01)
B64D 45/00 (2006.01)
G08G 5/00 (2006.01)
G08G 5/06 (2006.01)
G01S 13/93 (2006.01)

(52) U.S. Cl.
CPC ............... *G06F 17/00* (2013.01); *B64C 25/42* (2013.01); *B64C 25/426* (2013.01); *B64D 43/00* (2013.01); *B64D 45/00* (2013.01); *G08G 5/0021* (2013.01); *G08G 5/065* (2013.01); *G01S 2013/9335* (2013.01)
USPC .......................................... 701/29.1; 340/945

(58) Field of Classification Search
USPC .......................................... 701/29.1; 340/945
See application file for complete search history.

(56) References Cited

U.S. PATENT DOCUMENTS

| 6,118,401 | A  | 9/2000  | Tognazzini     |
|-----------|----|---------|----------------|
| 6,486,798 | B2 | 11/2002 | Rast           |
| 6,963,293 | B1 | 11/2005 | Rast           |
| 7,055,994 | B2 | 6/2006  | Martin         |
| 7,188,983 | B2 | 3/2007  | Dunn           |
| 7,379,165 | B2 | 5/2008  | Anderson et al.|
| 7,579,980 | B2 | 8/2009  | Anderson et al.|
| 7,783,427 | B1 | 8/2010  | Woodell et al. |

(Continued)

FOREIGN PATENT DOCUMENTS

EP 0526424 A2 2/1993
EP 1787142 5/2007

*Primary Examiner* — Thomas G Black
*Assistant Examiner* — Tyler Paige
(74) *Attorney, Agent, or Firm* — Shumaker & Sieffert, P.A.

(57) ABSTRACT

Systems and methods are operable to present braking distance information to crew of an installation aircraft. An exemplary embodiment determines a braking distance for a braking maneuver of the installation aircraft, wherein the braking distance is based on a current ground speed of the aircraft; and generates a graphical representation that is presented on a display, wherein a location of a graphical icon on the graphical representation indicates the determined braking distance from the installation aircraft.

20 Claims, 4 Drawing Sheets

(56) References Cited

U.S. PATENT DOCUMENTS

| | | |
|---|---|---|
| 7,869,305 B2 | 1/2011 | Anderson et al. |
| 7,903,023 B2 | 3/2011 | Cornic et al. |
| 7,916,042 B2 * | 3/2011 | Constans .................. 340/945 |
| 8,121,786 B2 | 2/2012 | Morbey et al. |
| 8,264,377 B2 | 9/2012 | Griffith |
| 8,275,501 B2 * | 9/2012 | Villaume ..................... 701/18 |
| 8,436,750 B2 * | 5/2013 | Fabre et al. .................. 340/951 |
| 8,494,692 B2 * | 7/2013 | Valentova et al. ............ 701/16 |
| 2010/0001882 A1 * | 1/2010 | Jeddi ........................... 340/961 |
| 2010/0219988 A1 | 9/2010 | Griffith |
| 2011/0087417 A1 | 4/2011 | Anderson et al. |
| 2011/0246003 A1 * | 10/2011 | Lafon et al. .................. 701/16 |
| 2011/0279304 A1 | 11/2011 | Yonemoto et al. |
| 2013/0127642 A1 * | 5/2013 | Maggiore et al. ............ 340/947 |

\* cited by examiner

Figure 1:
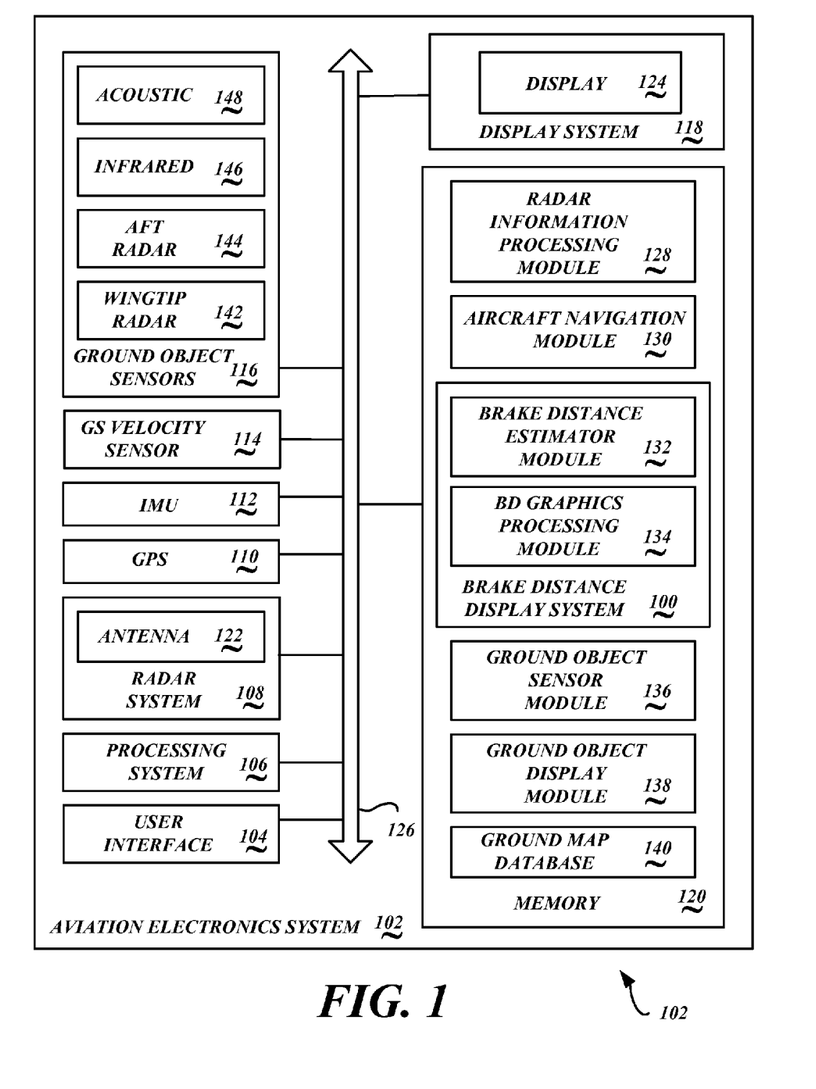
FIG. 1 is a block diagram of a brake distance display system integrated into an aircraft avionics system.

*FIG. 5* ics system 102. The example brake distance display system 100 is integrated with one or more human machine interface (HMI) technologies to enhance the totality of information that is presented to the crew of an installation aircraft as the installation aircraft is conducting various surface operations. For example, the crew may be taxiing across a runway or pulling up to a gate terminal. During such operations, the installation aircraft is moving autonomously under its own power and under the control of the crew (as opposed to being towed by a tug or other vehicle).

Embodiments of the brake distance display system 100 are configured to compute and graphically indicate a braking distance (interchangeably referred to as a determining and presenting a stopping distance) of the installation aircraft. The determined braking distance is graphically illustrated to the crew on a display of a display system.

A variety of braking factors may be considered in determining a braking distance. Example braking factors include, but are not limited to, current ground speed of the installation aircraft, current weather conditions, when the braking operation is initiated, the rate of applied braking forces, and/or aircraft braking capabilities (e.g., normal braking vs. emergency braking). Aircraft braking capabilities may be based on aircraft test results, on design capabilities, and/or on pre-defined values.

Further, a range of braking distances may be presented on the display system. In an example embodiment, a range of presented braking distances is determined based on a computed confidence level corresponding to probable braking distances. The braking distance range may be based on one or more current braking factors that may influence the stopping capability of the installation aircraft.

An exemplary embodiment of the aircraft avionics system 102 includes a user interface 104, a processing system 106, a radar system 108, a global positioning system (GPS) 110, an inertial measurement unit (IMU) 112, a ground speed (GS) velocity sensor 114, a plurality of ground object sensors 116, a display system 118, and a memory 120. The radar system 108 includes an antenna 122. The display system 118 includes a display 124. It is appreciated that the aviation electronics system 102 includes many other components and/or systems that are not illustrated or described herein.

The above-described components, in an exemplary embodiment, are communicatively coupled together via a communication bus 126. In alternative embodiments of the aviation electronics system 102, the above-described components may be communicatively coupled to each other in a different manner. For example, one or more of the above-described components may be directly coupled to the processing system 106, or may be coupled to the processing system 106 via intermediary components (not shown). Any suitable processing system 106 may be used.

The memory 120 comprises portions for storing a radar information processing module 128, an aircraft navigation module 130, a brake distance estimator module 132, a brake distance (BD) graphics processing module 134, a ground object sensor module 136, and a ground object display module 138. Further, an optional ground map database 140 may be included in the memory 120.

In some embodiments, the radar information processing module 128, the aircraft navigation module 130, the brake distance estimator module 132, the brake distance (BD) graphics processing module 134, the ground object sensor module 136, and/or the ground object display module 138 may be integrated with other logic, may be integrated with other modules, and/or reside in other memories (not shown). In other embodiments, some or all of these memory and other

SYSTEMS AND METHODS FOR DISPLAYING AIRCRAFT BRAKING DISTANCE DURING SURFACE OPERATIONS

PRIORITY CLAIM

This application claims the benefit of U.S. Provisional Application Ser. No. 61/653,297, filed May 30, 2012, the contents of which are hereby incorporated by reference in their entirety. This application further claims the benefit of U.S. Provisional Application Ser. No. 61/706,632, filed Sep. 27, 2012, the contents of which are hereby incorporated by reference in their entirety.

BACKGROUND OF THE INVENTION

Advanced human machine interface (HMI) technologies are becoming more prevalent in aircraft of the installation aircraft. These emerging HMI technologies provide additional situational awareness information to the crew. When their aircraft is traveling over the ground during various types of surface operations (such as taxiing, approaching a gate terminal, etc.) there is a need for improved integration of the available information that is presented to the crew of the aircraft by the various available HMI technologies.

SUMMARY OF THE INVENTION

Systems and methods of presenting braking distance information to crew of an installation aircraft are disclosed. An exemplary embodiment determines a braking distance for a braking maneuver of the installation aircraft, wherein the braking distance is based on a current ground speed of the aircraft; and generates a graphical representation that is presented on a display, wherein a location of a graphical icon on the graphical representation indicates the determined braking distance from the installation aircraft.

BRIEF DESCRIPTION OF THE DRAWINGS

Preferred and alternative embodiments are described in detail below with reference to the following drawings.

DETAILED DESCRIPTION OF THE PREFERRED EMBODIMENT

FIG. 1 is a block diagram of an embodiment of a brake distance display system 100 integrated into an aircraft aviondata manipulation functions in the various modules may be provided by other electronic devices suitably connected to the aviation electronics system 102. For example, one or more of the modules may be implemented in an electronic flight bag (EFB). Modules 128, 130, 132, 134, 136, 138 and/or database 140 residing in the memory 120 are retrieved and executed by the processing system 106 or another suitable processing system. Further, the ground map database 140 may be implemented with other databases, may be implemented in various formats, such as a buffer or the like, and/or may be implemented in another memory (not shown).

The memory 120 may be any suitable memory device or system. Depending upon the embodiment, the memory 120 may be a dedicated memory system, may be part of another component or system, and/or may be a distributed memory system. The memory 120 may also include other logic, modules and/or databases not illustrated or described herein.

In the various aviation electronics systems 102 that may be employed in the installation aircraft, a plurality of optional ground object sensors 116 may be employed. Such optional ground object sensors 116 may be components of one or more HMI systems.

The ground object sensors 116 are configured to detect ground objects that are in proximity to the installation aircraft while the installation aircraft is traveling over the ground. Example ground object sensors 116 may include wingtip radar sensors 142, an aft radar sensor 144, an infrared sensor 146, and/or an acoustic sensor 148. These ground object sensors 116 provide input to the ground object sensor module 136 (or to a plurality of ground object sensor modules 136 when a plurality of different HMI technologies are deployed about the installation aircraft). Based on the received sensor input, the ground object sensor module 136 is configured to determine the distance and location of detected ground objects from the installation aircraft and/or the ground object sensors 116 that are detecting the ground object.

In an example embodiment, one or more wingtip radar sensors 142 may be located at the wingtips of the installation aircraft's wings. An aft radar sensor 144 may be provided to detect ground object behind the aft of the installation aircraft. In some embodiments, the wingtip radar sensors 142 and/or the aft radar sensor 144 are co-located in a lighting fixture with aircraft warning lights and/or other types of aircraft lights.

In the various embodiments, the orientation of the wingtip radar sensors 142 and/or the aft radar sensor 144 is selected so that the emitted radar signals are emitted in a direction of interest, or field of view (FOV) that is associated with the possible occurrence of a collision with a ground object. For example, the wingtip radar sensors 142 when located at the tips of the wings of the installation aircraft may be oriented along a horizontal plane to detect presence of ground objects at substantially the same height of the wings.

In some embodiments, a plurality of wingtip radar sensors 142 and/or the aft radar sensor 144 are used to provide radar coverage about an area of interest. For example, one or more of the wingtip radar sensors 142 may be oriented in a forward-looking direction so as to sense ground objects that are in front of the installation aircraft. Additionally, other wingtip radar sensors 142 may also be oriented in a backward-looking direction or an outward-looking direction so as to sense objects that are behind the wings or to the sides of the wings. Embodiments may employ any desired number of wingtip radar sensors 142 and/or the aft radar sensor 144. The wingtip radar sensors 142 and/or the aft radar sensor 144 communicate information corresponding to detected radar returns reflected from ground objects to the ground object sensor module 136. The radar information is used so that the range and/or location of the detected ground objects from the installation aircraft may be determined.

The field of views (FOVs) of the various ground object sensors 116 provide a desired coverage of a region of space around the installation aircraft. The FOV parameters are derived from typical accident geometry and functional requirements. Any blind spots surrounding the installation aircraft are based on the FOV of one candidate technology (radar) and constraints associated with placing the radars inside the light modules. Other FOVs are possible, depending upon where the various ground object sensors 116, such as the example wingtip radar sensors 142 and/or the aft radar sensor 144, are placed about the installation aircraft.

In an example embodiment, the wingtip radar sensors 142 and/or the aft radar sensor 144 are an industrial, scientific, and medical (ISM) 2.4 GHz band and distance-measurement radar with related electronic gear. In one embodiment, a sensor node antenna for the ISM band facilitates wireless communication of a gateway unit (not shown) that is included in the installation aircraft so that information detected by the ground object sensors 116 is communicated to the aviation electronics system 102. The gateway unit is a communication device that is configured to wirelessly receive the information from one or more of the various optional ground object sensors 116, and then re-transmit the information to the processing system 106 executing the ground object sensor module 136.

The GPS 110 is configured to receive a plurality of satellite signals which permit the aircraft navigation module 130 to accurately determine the installation aircraft's current location, and optionally, determine the installation aircraft's altitude. When GPS-determined locations are compared over time, velocity (ground speed) of the installation aircraft and bearing (heading, or direction of travel) of the installation aircraft may be determined.

The IMU 112 comprises a system of accelerometers, gyroscopes and the like that are configured to sense movement of the installation aircraft. Based on the sensed movement, and/or detected changes in movement, the aircraft navigation module 130 may use the information provided by the IMU 112 to accurately compute the installation aircraft's location, bearing (heading, or direction of travel), and/or ground speed.

The location of the installation aircraft as determined by the GPS 110 and/or the IMU 112 may be used to reference the relative location and/or bearing of the installation aircraft. Accordingly, when braking distance information is presented on the display, as determined by the BD graphics processing module 134, the crew will better appreciate the significance of the presented stopping information.

Based on the detection of one or more ground objects in proximity to the installation aircraft by one of the ground object sensors 116, and the subsequent determination of the distance and location of the detected ground object relative to the installation aircraft as determined by the ground object sensor module 136, the ground object display module 138, in cooperation with the BD graphics processing module 134, may generate and present an icon or other image on the display 124 corresponding to the detected ground object. Thus, the crew viewing the display 124 will intuitively understand the location of ground objects relative to the current location and/or bearing of their installation aircraft, particularly with respect to any concurrently presented braking distance information.

The location of the installation aircraft as determined by the GPS 110 and/or the IMU 112 may optionally be used to reference the location of the installation aircraft to a map of the surface that the installation aircraft is traversing. The optional ground map database 140 is a database of maps for various ground surfaces (airports) that the installation aircraft is expected to be at from time to time. Based on the current location of the aircraft, an appropriate map may be retrieved from the ground map database 140. Maps may be automatically selected based on current location of the installation aircraft, or may be manually specified by the crew based on a suitable identifier of the airport. The relevant portion of the map data (corresponding to the current location of the installation aircraft and an extent of the surface area graphically represented on the display 124) may then be concurrently presented with braking distance information.

The ground surface map provides information identifying the location of various structures on the surface, such as runway boundaries, taxiway boundaries, light and/or sign structures, buildings, or the like. Accordingly, the location of these various structures may be presented on the display 124 referenced to relative current location of the installation aircraft, and relative to determined stop locations and/or distances that are determined by the brake distance display system 100.

The radar system 108 may be any suitable radar system, such as, but not limited to, a weather radar that is operable to detect weather (which may be determined as, but not limited to, 4-Dimensional weather cube data) that is located relatively far away from the installation aircraft and/or to detect nearby aircraft. The radar system 108 includes an antenna 120 that is operable to emit radar signals and receive radar returns. A radar return is reflected energy from an object upon which the emitted radar pulse is incident on. The antenna 120 is swept in a back-and-forth motion, in an up and down direction, and/or in other directions of interest, such that the radar system 108 is able to detect weather, ground objects, and/or other aircraft, in an area of interest about the installation aircraft.

The radar information processing module 128 processes radar returns detected by the antenna 122 of the radar system 108. Various types of weather, and their associated attributes, may be determined by the radar information processing module 126 while the installation aircraft is in flight. Additionally, in some types of radar systems 110, location and/or altitude of other nearby aircraft may be determined based on the processed radar returns while the installation aircraft is in flight or when the installation aircraft is on the ground. Accordingly, information from the radar system 108 may be optionally input to the ground object sensor module 136. For example, when the scale of the display presented to the crew of the installation aircraft is set to encompass a relatively large area about the installation aircraft (that is, where the extent of the display exceeds the detection range of the ground object sensors 116), icons corresponding to the farther range detected ground objects that have been detected by the radar system 108 may be presented on the display 124.

In the various embodiments, the ground speed velocity sensor 114 provides information to the aviation electronics system 102 so that the current ground speed of the installation aircraft can be determined. The determined ground speed may additionally, or alternatively, determined by the IMU 112 and/or the GPS 110. The determined ground speed of the installation aircraft is one of the braking factors that is used by the brake distance estimator module 132 to determine braking distances for the installation aircraft.

The user interface 104 is configured to receive various operating instructions from the crew of the installation aircraft. For example, the crew may control presentation of ground brake distances on the display 124 or on another display device. As another example, the crew may adjust the extent of the displayed area about the installation aircraft. In an example embodiment, the planned route of travel over the ground surface may be selectively shown on the display. The presentation of braking distances and/or detected ground objects may be selectively presented or omitted via input through the user interface 118. Types and formats of presentation of the graphics used to present braking distances and/or detected ground objects may be selectively defined via input through the user interface 118.

In some embodiments, a pop up, small window, or the like may be superimposed over another display presentation. Presentation location and/or sizing of the pop up, small window, or the like may be specified via input through the user interface 104. For example, but not limited to, the radar system 108 may be providing information that is presented on the entirety of the display area on the display 124. Then, a relatively smaller pop up, small window, or the like showing the braking distances and/or detected ground objects may be overlaid on top of a portion of the current display.

Figure 2:
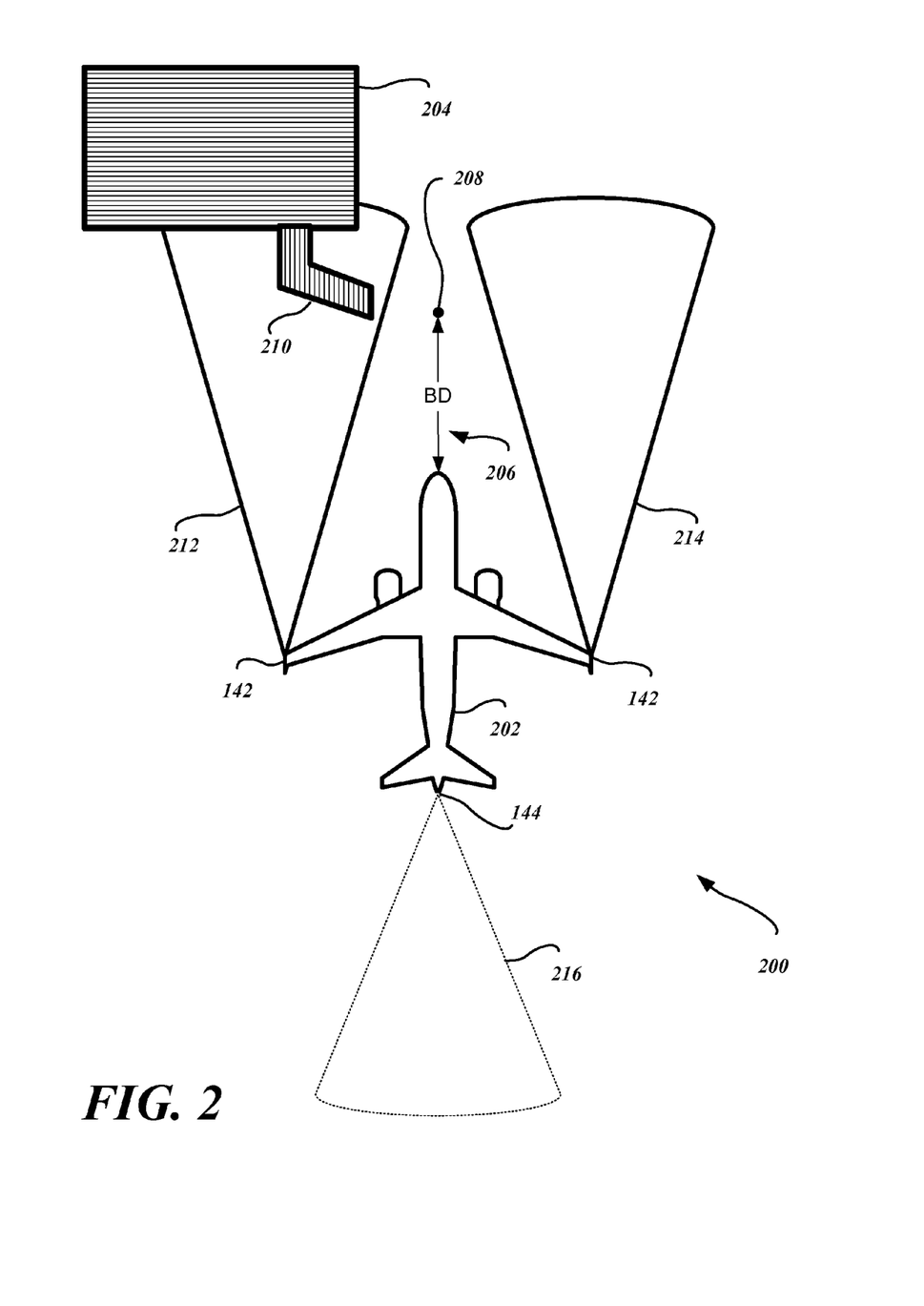
FIG. 2 is a simplified hypothetical plan view of an installation aircraft that is pulling up to, and is in the process of stopping at, a gate terminal.

FIG. 2 is a simplified hypothetical plan view 200 of an installation aircraft 202 that is pulling up to, and is in the process of stopping at, a gate terminal 204. In this hypothetical example plan view, the installation aircraft 202 needs to stop within the braking distance (BD) 206 so that the installation aircraft 202 can be fully stopped at the braking point 208 (defined as the location at which the installation aircraft 202 is fully stopped). Then, the walkway 210 can be extended to the door of the installation aircraft 202 so that the crew and any passengers may exit the installation aircraft 202.

Also illustrated is a left side FOV 212 provided by one or more wingtip radar sensors 142 located at the left wingtip of the installation aircraft 202. Here, the wingtip radar sensors 142 would be detecting the presence of the gate terminal 204 and the walkway 210. Accordingly, embodiments of the brake distance display system 100 may visually indicate information to the crew of the installation aircraft 202 to facilitate stopping of the installation aircraft 202 at the desired braking point 208. Embodiments may also optionally illustrate the terminal 204 and the walkway 210 to provide further visual information to facilitate stopping of the installation aircraft 202 at the desired braking point 208.

Further illustrated is a right side FOV 212 provided by one or more wingtip radar sensors 142 located at the left wingtip of the installation aircraft 202. Here, it is apparent that there are no detected ground objects by the wingtip radar sensors 142 located at the right wingtip of the installation aircraft 202.

Optionally illustrated is an aft FOV 216 provided by an aft radar sensor 144. When the aircraft is backing away from the terminal 204 and the walkway 210 under its own power, embodiments of the brake distance display system 100 may determine braking distances for the installation aircraft 202 as it is moving in a rearward direction. These determined braking distances would then be visually indicated on the display 124.

Embodiments of the brake distance display system 100 are configured to determine the braking distance 206 of the installation aircraft 202, and then present braking distance information of the display 124 (FIG. 1). The braking distance 206 is determined based on a variety of braking factors. Braking distance equations are well known in the art and are not described herein for brevity. Any suitable braking distance equation may be used by the various embodiments of the brake distance display system 100.

The braking distance 206 may be conceptually described as a function of some proscribed rate of deceleration (negative acceleration) for the installation aircraft 202. That is, a deceleration rate is selected for the installation aircraft 202 that is assumed to be used for a braking maneuver, wherein the deceleration rate is used to determine the braking distance.

Generally, an acceleration rate may be approximated as:

$$\text{Acceleration Rate} = (\text{Final Velocity} - \text{Initial Velocity}) / \text{Stopping Time} \quad (1)$$

Here, the final velocity is understood to be zero (0) since the installation aircraft 202 is coming to a complete stop. The initial velocity is the ground speed of the installation aircraft 202 when the braking maneuver is initiated. The stopping time is an assumed time period (duration) that the installation aircraft 202 will have completed its braking maneuver to a full stop. Also, since the installation aircraft 202 is braking, the acceleration rate of Equation (1) is a negative number. A negative acceleration value is referred to herein interchangeably as a rate of deceleration.

Embodiments of the brake distance display system 100 determine the braking distance 206 based on a predefined (assumed or specified) rate of deceleration of the installation aircraft 202. For example, but not limited to, the rate of deceleration may be based on the current design and/or configuration of the brakes which may define a maximum braking rate (maximum rate of deceleration) for the installation aircraft 202.

Based on the current ground speed (velocity) of the installation aircraft 202, the time required for stopping may be determined from Equation (1). The braking distance 206 may then be determined based upon the determined stopping time. Accordingly, it is appreciated that the faster that the installation aircraft 202 is traveling at the time of initiating a braking procedure (and assuming a constant rate of deceleration), the greater the required braking distance 206 will be. Similarly, the smaller the assumed rate of deceleration (for a given initial ground speed), the greater the required braking distance 206 will be.

It is appreciated that there will be an inherent level of uncertainty in the determination of the braking distance 206. This uncertainty may be factored into the determination of the braking distance 206 based on a variety of other braking factors. When the braking distance 206 is determined with uncertainty, a range of braking distances may be determined and presented on the display 124.

To determine a range of braking distances, one or more relevant braking factors are identified. Then, a range of each identified braking factor is determined. One extent of the determined range of one the identified braking factors (a first extent) corresponds to a calculation of a shorter braking distance. The other extent (a second extent) of the range of the same identified braking factor corresponds to a calculation of a longer braking distance. When a shortest braking distance for the installation aircraft 202 is determined, the first extents for each of the identified braking factors are used. When the longest braking distance is determined, the second extents for each of the identified braking factors are used. The shortest braking distance and the longest braking distance determined therefrom determines the range of the braking distances for the installation aircraft 202 given the particular circumstances in effect at the time of the braking.

Further, the level of uncertainty may change as one or more of the braking factors change or themselves become uncertain. For example, the likelihood of the onset of rain may add to the uncertainty in the determination of braking distances. Puddles of water on the taxiway surface may also add to the uncertainty in the determination of braking distances because the coefficient of friction is different for a dry surface and a wet surface. Further, reaction times may vary between individual crew members. Accordingly, embodiments are configured to account for uncertainties in determined braking distances that are introduced by uncertainty in the considered braking factors.

Variations in uncertainty may be represented using a probability distribution representing a changing range of values for a particular braking factor. Such probability distributions may be defined based on empirical test data, estimates, or personal judgment. In a preferred embodiment, a bell curve is defined using predefined standard deviation values and a predefined peak value, though any suitable statistical distribution function may be used. Further, the standard deviation values and/or peak values of the probability distributions may be adjusted based on current operating conditions (such as a current weather condition). The probability distributions may be stored in the brake distance estimator module 132 or in another suitable memory location or memory device.

A first example braking factor that may be considered in determining the braking distance 206 is the assumed rate of deceleration of the installation aircraft 202 during a braking maneuver (interchangeably referred to as a stopping maneuver). For example, a predetermined rate of deceleration may be defined for the installation aircraft 202 that provides a deceleration of the installation aircraft 202 to a full stop that is comfortable and/or safe to the crew and/or passengers of the installation aircraft 202. For example, the crew and/or passengers of the installation aircraft 202 are typically secured in their seats with seat belts (seat restraints) when the installation aircraft 202 is moving. If the rate of deceleration is too great, forces exerted by the seat belts on the crew and/or passengers of the installation aircraft 202 may become uncomfortable. Alternatively, or additionally, if the rate of deceleration is too great, baggage and/or cargo in the installation aircraft 202 may be damaged. Accordingly, experience, design, and/or testing may dictate a proscribed first rate of deceleration that is comfortable and/or safe for the crew and/or passengers of the installation aircraft 202.

On the other hand, some circumstances may require a very rapid deceleration of the installation aircraft 202. For example, a rapid deceleration may be required to avoid collision with a detected ground object. Here, emergency braking and/or application of reverse thruster power may be used to rapidly stop the installation aircraft 202. Accordingly, a proscribed second rate of deceleration based on the maximum stopping capability of the installation aircraft 202 may be defined. Here, the rate of deceleration is increased based on a braking factor corresponding to an emergency condition necessitating a rapid deceleration of the installation aircraft 202 to a full stop Thus, the uncertainty in the determined braking distance may be characterized by a first rate of deceleration that is comfortable and safe for the crew and/or passengers of the installation aircraft 202, thereby resulting in determination of a first braking distance based on a current ground speed. A second determined braking distance may be characterized by a second rate of deceleration that is necessitated by an emergency or other operating condition, thereby resulting in determination of a second braking distance based on the same current ground speed.

The coefficient of friction between the surface and the landing gear (wheels) of the installation aircraft 202 may be another braking factor in determining the range of braking distances. For example, a dry cool surface will exhibit a higher coefficient of friction than a wet surface. A higher coefficient of friction will permit a faster stop of the installation aircraft 202, thereby resulting in the determination of the range of braking distances. Here, there may be little difference between a first coefficient of friction (associated with shorter braking distances) and a second coefficient of friction (associated with longer braking distances). Or, a single coefficient of friction may be used to determine the range of braking distances, or even a single braking distance.

When a range of braking distances are determined based on different rates of deceleration, embodiments of the brake distance display system 100 may be configured to take into account other braking factors. In some embodiments, an adjustment may be applied to the predefined rates of deceleration based on the nature of a particular braking factor. In other embodiments, a plurality of different rates of deceleration may be stored in a database or the like which are defined in a performance table or the like specifying a normal rate of deceleration with other rates of deceleration to be used for different operating conditions which are associated with one or more of the braking factors. Thus, the most applicable rate of deceleration may then be selected based those braking factors that are relevant to the current stopping conditions encountered by the installation aircraft 202.

For example, weather conditions may affect the rates of deceleration used to determine the range of braking distances. If weather conditions are dry, there is less likelihood of skidding during a braking maneuver since the coefficient of friction is relatively high. Accordingly, higher rates of deceleration may be used to determine the range of braking distances than the rates of deceleration that are used when the weather conditions are wet and/or icy.

Another braking factor may be ambient (outside) temperature. During extremely high ambient temperatures, the runway pavement may become relatively slippery due to accumulated oils and other matter on the surfaces of the runway (thereby exhibiting a relatively lower coefficient of friction). Accordingly, lower rates of deceleration may be used to determine the range of braking distances than the rates of deceleration that are used when the weather conditions are not extremely hot.

Current weight of the installation aircraft 202 may be a factor that affects the determination of braking distances. For example, higher rates of deceleration may be used to determine the range of braking distances when the installation aircraft 202 is empty than the rates of deceleration that are used when the installation aircraft 202 is fully loaded with passengers, cargo, and/or fuel. Here, momentum will be greater when the installation aircraft 202 is relatively heavy, thereby requiring a greater braking distance.

Reaction time of the crew to initiate the braking maneuver may be a braking factor that affects the determination of braking distances. For example, reaction time of the crew may be different depending upon the state of readiness of the crew to initiate the braking maneuver (such as when the crew is pulling up to complete stop at the terminal gate 204 vs. when the crew is moving the installation aircraft 202 down a taxi way after landing or prior to taking off). Here, higher rates of deceleration may be used when it is likely that the crew may quickly initiate the braking maneuver than the rates of deceleration that are used when it is likely that a greater amount of crew reaction time will be required.

Other braking factors may include the nature of the operational situation (normal stopping vs. emergency stopping). As noted above, the rate of deceleration may be assumed to be greater during an emergency stopping operational situation than when the installation aircraft 202 is making a normal braking maneuver.

Another braking factor may be the particular configuration of the installation aircraft 202 controls. Here, the time required of the crew to initiate a braking maneuver may be different for different types, makes and/or models of aircraft. For example, the pilot of a single engine airplane may be able to perform a braking maneuver more quickly than the crew of a four engine jetliner.

Figure 3:
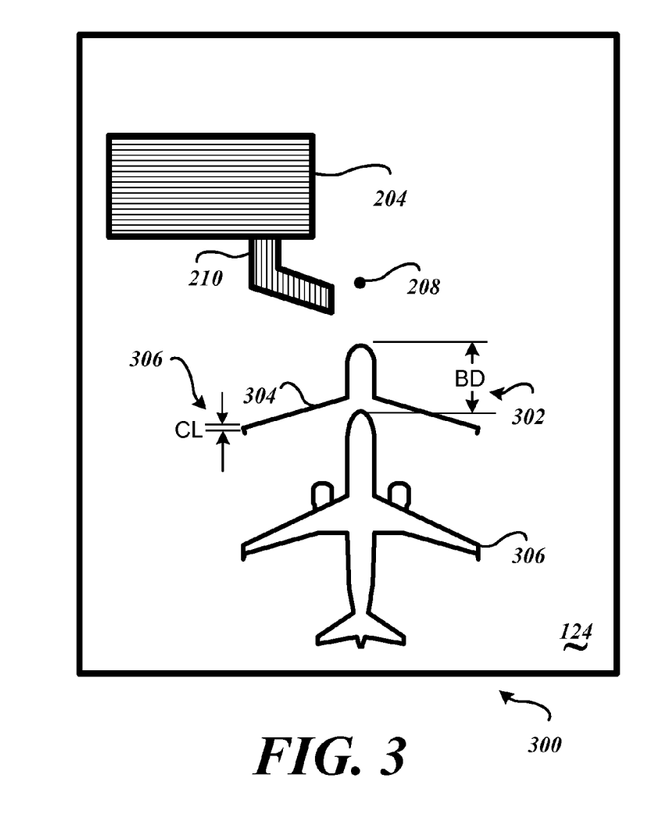
FIG. 3 illustrates an example graphical presentation that is presented on the display to indicate braking distances determined for the installation aircraft as it is approaching the example terminal gate.

FIG. 3 illustrates an example graphical presentation 300 that is presented on the display 124 to indicate braking distances 302 determined for the installation aircraft 202 as it is approaching the example terminal gate 204. Accordingly, a location of a graphical icon 304 on the display 124 indicates the determined braking distance from the installation aircraft 202, also shown as a graphical icon 306. Here, the graphical icon 306 corresponding to the installation aircraft is represented as an outline of a forward portion of the installation aircraft 202. In some embodiments, another icon is used instead of the illustrated graphical icon 306, such as a marker, cross, circle, or the like. In other embodiments, the icon representing the installation aircraft 202 is optionally omitted. Depending upon the embodiment, the crew may select how the location of the installation aircraft 202 will be indicated on the display 124.

Here, in this simplified hypothetical example, the intended braking point 208 is optionally shown at a location where the walkway 210 can be extended to the door of the installation aircraft 202 so that the crew and any passengers can exit. The intended braking point may or may not be included in the graphical presentation 300.

Embodiments present the braking distance information using a format that is readily discernable to the crew of the installation aircraft 202. In the example graphical presentation 300, the braking distance is graphically represented on the display 124 using an icon 304 that approximates the outline of the forward portion of the installation aircraft 202. The icon 304 may be interchangeably referred to herein as a "safety ghost ship" icon.

As noted above, some embodiments may be configured to present map information on the display 124 concurrently with an indication of the braking distances. In this example, mapping data may be used to determine the location of the gate terminal 204 (and possibly the walkway 210). Presentation of icons corresponding to the gate terminal 204 and the walkway 210 on the display 124 further enhances the ability of the crew to appreciate the significance of the presented safety ghost ship icon 304. Alternatively, or additionally, the wingtip radar sensors 142, or other ground object sensors, may detect the gate terminal 204 and/or the walkway 210 so that corresponding icons can be presented on the display 124.

In this embodiment, the safety ghost ship icon 304 is shown as a line that represents the outline of the forward portion of the installation aircraft 202. Accordingly, the crew has a better appreciation of the location of the nose of the installation aircraft 202, and the extent of the wings of the installation aircraft 202, if a braking maneuver is initiated to stop the installation aircraft 202.

In an example embodiment, the determined braking distance(s) 302 may be graphically indicated using displayed alpha-numeric text. For example, if the braking distance 302 is determined to be 35 feet, the text "Braking Distance is 35 feet" may be presented on the display at a suitable location. Alternatively, or additionally, the braking distance may be aurally communicated to the crew using a suitable speech synthesis system. A range of braking distances 302 may also be presented if there is a degree of uncertainty in the determination of the braking distance 302. Presentation of the textual information may be manually suppressed via input through the user interface 104.

In this simplified hypothetical example illustrated in FIG. 3, the crew intuitively understands that the braking maneuver does not yet need to be initiated since the nose of the presented safety ghost ship icon 304 has not yet reached the intended braking point 208 (which may or may not be presented on the display 124). Here, the crew is able to intuitively understand when they must initiate to braking maneuver so as to stop at or near the intended braking point 208.

Further, assuming that the current ground speed of the installation aircraft 202 is relatively low (in view that the installation aircraft 202 is approaching the gate terminal 204), the degree of uncertainty is relatively small. As noted above, some embodiments determine the braking distance 302 as a range of braking distances. The range of braking distances is based on the current ground speed of the installation aircraft 202 and one or more rates of deceleration that may be varied based on relevant braking factors. That is, since the value of the current ground speed is relatively small, a difference between a first braking distance determined using a first rate of deceleration and a second braking distance using a second rate of deceleration will be relatively small.

In an example embodiment, the "thickness" of the safety ghost ship icon 304 may be correlated with the range of braking distances that are determined using the first rate of deceleration and the second rate of deceleration. That is, a distance between the shortest braking distance and the longest braking distance is represented by a thickness dimension of the graphical icon 304. Here, since the current ground speed of the installation aircraft 202 is relatively slow, the difference between the two braking distances is relatively low, as denoted by the indicated confidence level (CL) 306 shown in FIG. 3. Thus, the thickness of the safety ghost ship icon 304 is relatively small to indicate a relatively small range of braking distances.

Figure 4:
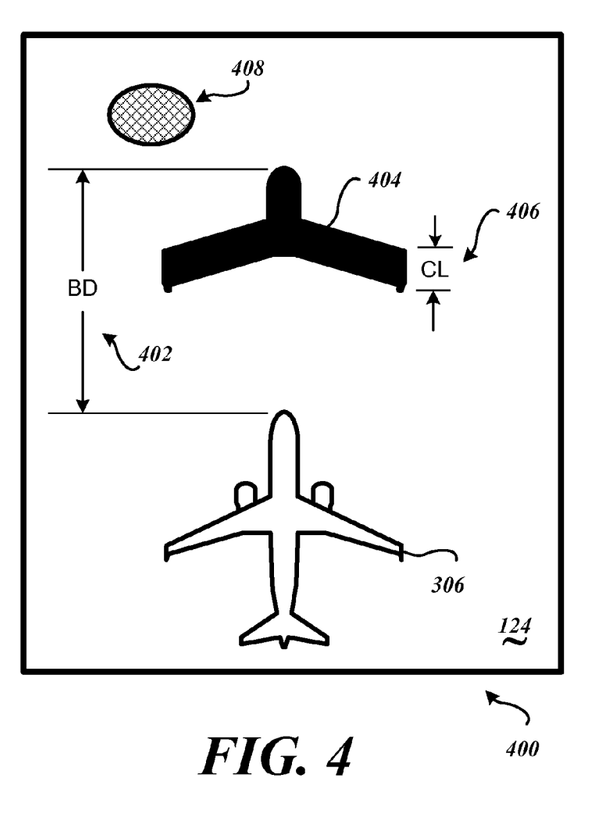
FIG. 4 illustrates another example graphical presentation that is presented on the display to indicate braking distances determined for the installation aircraft as it is taxiing down a runway or other surface.

In contrast, FIG. 4 illustrates another example graphical presentation 400 that is presented on the display 124 to indicate braking distances 402 determined for the installation aircraft 202 as it is taxiing down a runway or the like. The location of the graphical icon 404 on the display indicates the determined braking distance from the installation aircraft 202. It is appreciated that the current ground speed of the installation aircraft 202 is greater than the current ground speed represented in FIG. 3. That is, the installation aircraft 202 is likely traveling at a higher velocity when taxiing down a runway than when it is approaching the gate terminal 204 illustrated in FIG. 3.

Since the current ground speed of the installation aircraft 202 when taxiing down a runway is relatively high, the braking distance 402 will be relatively longer. For example, the braking distance 402 is greater than the braking distance 302 illustrated in FIG. 3.

Further, since the current ground speed is relatively high, there is a noticeable degree of uncertainty in the calculation of braking distances using a first rate of deceleration and a second rate of deceleration (which are different in view of the considered braking factors). This relatively wide disparity in the certainty level (CL) 404 is graphically indicated to the crew by the relative thickness of the presented safety ghost ship icon 406. Here, the presented safety ghost ship icon 406 is substantially thicker than the presented safety ghost ship icon 304 of FIG. 3 (since the current ground speed of the installation aircraft 202 is slower because the current ground speed is approaching the gate terminal 204).

As noted herein, some embodiments of the installation aircraft 202 may have one or more ground object sensors 116 and/or HMI systems. In the simplified example illustrated in FIG. 4, the icon 408 corresponds to a detected ground object. Here, upon detection of a ground object, the location and range of the ground object from the installation aircraft 202 may be determined, and the icon 408 may be generated and then included on the display 124. Since the relative location of the icon indicates the distance from the ground object and the installation aircraft 202, and since the safety ghost ship icon 406 indicates a range of likely stopping locations of the installation aircraft 202, the crew may better appreciate the risk of collision that the detected ground object presents to the installation aircraft 202.

Figure 5:
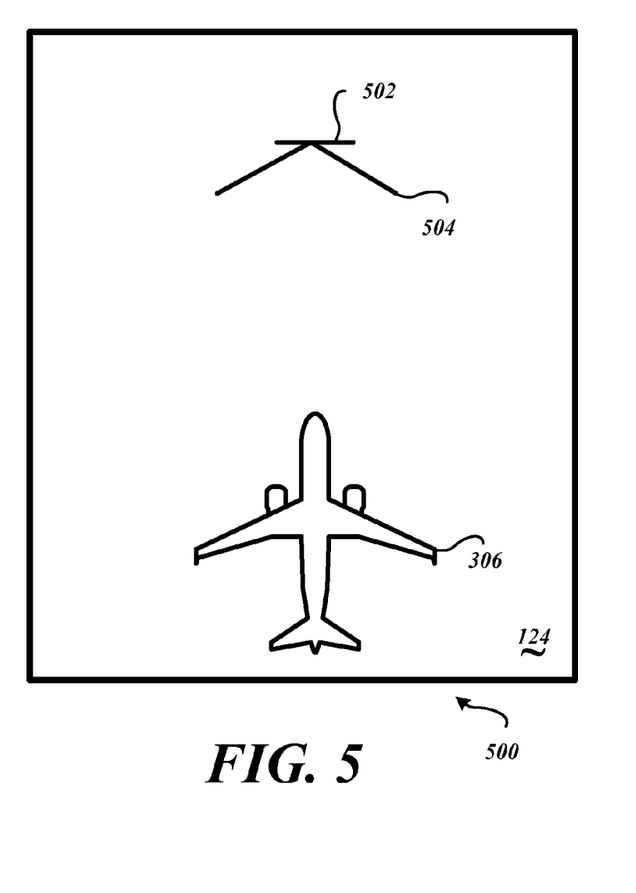
FIG. 5 illustrates an alternative graphical representation illustrating a determined braking distance.

Any suitable graphical representation may be used by the various embodiments. FIG. 5 illustrates an alternative graphical representation 500 illustrating a determined braking distance. The straight line 502 indicates the determined location of the nose of the installation aircraft 202 at the determined braking distance. The chevron 504 indicates a general approximation of the orientation and extent of the wings of the installation aircraft 202.

Figure 6:
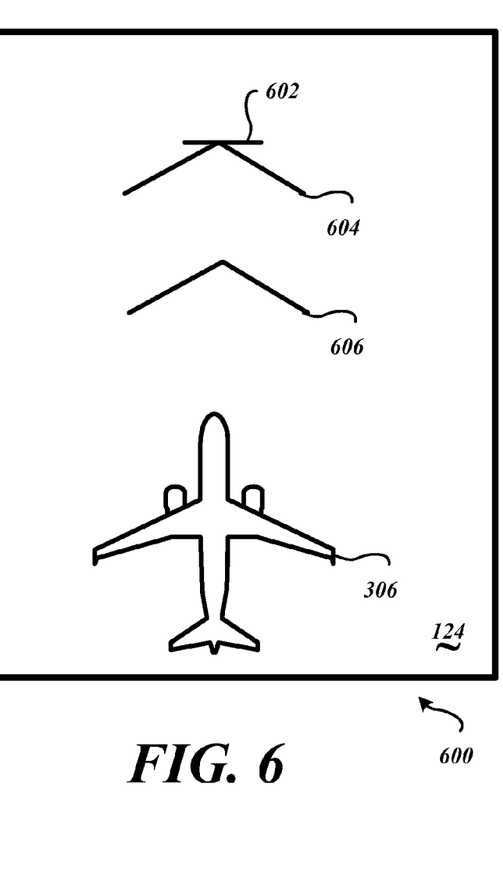
FIG. 6 illustrates an alternative graphical representation illustrating determined braking distances when there is a relatively high degree of uncertainty in the calculation of the braking distance.

FIG. 6 illustrates an alternative graphical representation 600 illustrating determined braking distances when there is a relatively high degree of uncertainty in the calculation of the braking distance. The straight line 602 indicates the determined location of the nose of the installation aircraft 202 at the determined braking distance. The chevron 604 indicates a general approximation of the orientation and extent of the wings of the installation aircraft 202 at a first braking distance. The chevron 606 indicates a general approximation of the orientation and extent of the wings of the installation aircraft 202 at a second braking distance. Thus, the difference between the presentation location of the two chevrons 604, 606 on the graphical representation 600 visually indicates to the crew the difference between the two braking distances.

The display 124 (FIG. 1) may be any suitable device that is available for viewing presented braking distance information. In an example embodiment, the display 124 is a primary flight display (PFD). Alternatively, or additionally, the display 124 may be incorporated into an electronic flight bag (EFB) or other portable display device.

Information used to determine the braking distance, or range of braking distances, may be automatically provided by various sensing devices, such as illustrated in FIG. 1. Alternatively, or additionally, information may be manually input by the crew. For example, but not limited to, a crew member may manually input the current ground speed via the user interface 104 of an EFB. As another example, the crew may manually specify one or more of the braking factors, such as, but not limited to, a weather-related braking factor such as ice, snow, precipitation, and/or ambient temperature.

In the various embodiments, attributes of presented braking distance icons may be used to indicate supplemental information relating to the nature of the determined braking distances. In an example embodiment, illumination intensity of a presented braking distance icon may be adjusted to indicate some characteristic or degree of importance. For example, a higher illumination intensity may indicate a higher degree of uncertainty in the determined braking distance. Here, a higher illumination intensity may be used instead of, or to supplement, the use of different thicknesses of a presented safety ghost ship icon to indicate the uncertainty and/or difference between two determined braking distances.

Color of a presented braking distance icon may be used to indicate various operational situations to the crew of the installation aircraft 202. For example, a green color of the presented braking distance icon may indicate safe and/or normal operating condition. A yellow color of the presented braking distance icon may be used to indicate various caution situations to the crew of the installation aircraft 202. A red color of the presented braking distance icon may be used to indicate various warning and/or dangerous situations to the crew of the installation aircraft 202. Flashing, blinking, changing illumination intensity, or the like may further be used to indicate different or changing operational situations to the crew of the installation aircraft 202.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   determining, by a processing system, a range of braking distances for a braking maneuver of an installation aircraft based on a current ground speed of the installation aircraft, the range comprising a first braking distance and a second braking distance;
   generating, by the processing system, a graphical representation comprising a graphical icon, wherein the graphical icon indicates a first stopping location that is the first braking distance from the installation aircraft and a second stopping location that is the second braking distance from the installation aircraft; and
   presenting the graphical representation on a display.

2. The method of claim 1, wherein determining the range of braking distances comprises:
   determining a longest braking distance based on at least one braking factor, the first braking distance being the longest braking distance; and
   determining a shortest braking distance based on the at least one braking factor, the second braking distance being the shortest braking distance.

3. The method of claim 2, wherein a distance between the shortest braking distance and the longest braking distance is represented by a thickness dimension of the graphical icon.

4. The method of claim 1, wherein the generated graphical icon comprises an outline of a forward portion of the installation aircraft or a chevron, wherein a width of the chevron corresponds to an orientation and an extent of wings of the installation aircraft.

5. The method of claim 1, wherein determining, by the processing system, the range of braking distances comprises:
   predefining a deceleration rate for the installation aircraft associated with the braking maneuver, wherein determining the range of braking distances comprises determining the range based on the deceleration rate.

6. The method of claim 1, further comprising:
   detecting a ground object near the installation aircraft using a ground object sensor;
   determining a location of the ground object relative to the location of the installation aircraft based on input from the ground object sensor,
   wherein the generated graphical representation presented on the display indicates the ground object with a ground object icon, and
   wherein a presented location of the ground object icon on the display corresponds to the determined location of the ground object relative to a location of the installation aircraft.

7. The method of claim 1, further comprising selecting a map based on a current location of the installation aircraft, wherein the graphical representation comprises at least a portion of the map, and wherein presenting the graphical representation comprises concurrently presenting the at least the portion of the map and the graphical icon on the display.

8. The method of claim 1, wherein determining the range of braking distances comprises determining the range of braking distances based on a probability distribution of at least one braking factor.

9. The method of claim 1, further comprising selecting a first deceleration rate and a second deceleration rate, wherein determining, by the processing system, the range of braking distances further comprises determining the first braking distance based on the first deceleration rate and the second braking distance based on the second deceleration rate.

10. A braking distance display system comprising:
    a processing system configured to:
       determine a range of braking distances for a braking maneuver of an installation aircraft based on a current ground speed of the installation aircraft, the range comprising a first braking distance and a second braking distance; and
       generate a graphical representation comprising a graphical icon, wherein the graphical icon indicates a first stopping location that is the first braking distance from the installation aircraft and a second stopping location that is the second braking distance from the installation aircraft; and
    a display communicatively coupled to the processing system, wherein the display is configured to present the graphical representation generated by the processing system.

11. The system of claim 10, further comprising:
    at least one ground object sensor configured to detect a ground object,
    wherein the processing system is configured to determine a location of the ground object relative to the installation aircraft based on input from the at least one ground object sensor,
    wherein the generated graphical representation comprises a ground object icon that indicates the ground object, and
    wherein a presented location of the ground object icon on the display corresponds to the determined location of the ground object relative to a current location of the installation aircraft.

12. The system of claim 10, wherein the processing system is further configured to select a map based on a current location of the installation aircraft, and wherein the graphical representation comprises at least a portion of the map concurrently presented with the graphical icon.

13. The system of claim 10, wherein the processing system is configured to determine the range of braking distances by at least determining a longest braking distance based on at least one braking factor, the first braking distance being the longest braking distance, and determining a shortest braking distance based on the at least one braking factor, the second braking distance being the shortest braking distance.

14. The system of claim 10, wherein the graphical representation further comprises a braking point that indicates a desired location at which the installation aircraft will be fully stopped.

15. The system of claim 10, wherein a distance between the first braking distance and the second braking distance is represented by a thickness dimension of the graphical icon.

16. The system of claim 10, wherein the generated graphical icon comprises an outline of a forward portion of the installation aircraft or a chevron, wherein a width of the chevron corresponds to an orientation and an extent of wings of the installation aircraft.

17. The system of claim 10, wherein the processing system is configured to select a first deceleration rate and a second deceleration rate, and determine the range of braking distances by at least determining the first braking distance based on the first deceleration rate and the second braking distance based on the second deceleration rate.

18. The system of claim 17, wherein the processing system is configured to select the first and second deceleration rates based on at least one of: a weather condition, a range of coefficients of friction between landing gear of the installation aircraft and the surface over which the installation aircraft is moving, or a range of weights of the installation aircraft.

19. A method comprising:
  receiving, by a processing system, a current ground speed of an installation aircraft;
  selecting a braking factor;
  determining, by the processing system, a longest braking distance for a braking maneuver of the installation aircraft based on the selected braking factor and the current ground speed;
  determining, by the processing system, a shortest braking distance for the braking maneuver based on the selected braking factor and the current ground speed;
  generating, by the processing system, a graphical representation comprising at least one graphical icon, wherein a location of the at least one graphical icon within the graphical representation indicates the determined longest braking distance and the determined shortest braking distance; and
  presenting the graphical representation on a display.

20. The method of claim 19, wherein the at least one graphical icon comprises a first graphical icon and a second graphical icon, wherein a location of the first graphical icon within the graphical representation indicates the determined longest braking distance and a location of the second graphical icon within the graphical representation indicates the determined shortest braking distance.

* * * * *